United States Patent
Mondello et al.

(10) Patent No.: US 11,108,749 B2
(45) Date of Patent: Aug. 31, 2021

(54) SECURE DEVICE COUPLING

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 16/362,828

(22) Filed: Mar. 25, 2019

(65) Prior Publication Data
US 2020/0314074 A1 Oct. 1, 2020

(51) Int. Cl.
*H04L 29/06* (2006.01)
*H04L 9/08* (2006.01)
*H04W 12/0431* (2021.01)

(52) U.S. Cl.
CPC .......... *H04L 63/0478* (2013.01); *H04L 9/085* (2013.01); *H04L 9/0825* (2013.01); *H04L 63/1466* (2013.01); *H04W 12/0431* (2021.01)

(58) Field of Classification Search
CPC ............. H04L 63/0478; H04L 63/1455; H04L 9/0825; H04L 9/085; H04L 63/1466; H04W 12/0431
See application file for complete search history.

(56) References Cited

U.S. PATENT DOCUMENTS

| 10,771,244 | B2* | 9/2020 | Kim | H04W 12/0013 |
| 2010/0332833 | A1* | 12/2010 | Aissi | H04W 12/0013 |
| | | | | 713/169 |
| 2016/0330182 | A1* | 11/2016 | Jeon | H04L 63/062 |
| 2017/0236343 | A1* | 8/2017 | Leboeuf | G07C 9/27 |
| | | | | 340/5.61 |

(Continued)

OTHER PUBLICATIONS

U.S. Appl. No. 15/853,498, entitled, "Physical Unclonable Function Using Message Authentication Code", filed Dec. 22, 2017, 28 pages.

(Continued)

*Primary Examiner* — Hee K Song
(74) *Attorney, Agent, or Firm* — Brooks, Cameron & Huebsch, PLLC

(57) ABSTRACT

The present disclosure includes secure device coupling. An embodiment includes a processing resource, memory, and a network management device communication component configured to, identifying a network attached device within a first domain. Generating a domain device secret corresponding to the first domain. Each network attached device within the first domain can share the same domain device secret. Coupling iterations may be performed for each device within the first domain can include: generating a network management device private key and public key. Providing, via short-range communication, the network management device public key and the domain device secret to a network attached device communication component (Continued)

included in each network attached device of the first domain. A network attached device public key and data from the network attached device communication component in response to providing the network management device public key to the network attached device communication component is received from each device in the first domain.

22 Claims, 9 Drawing Sheets

(56) References Cited

U.S. PATENT DOCUMENTS

2018/0123784 A1* 5/2018 Gehrmann ............ H04L 9/0891
2019/0166635 A1* 5/2019 McColgan ........ H04W 12/0013

OTHER PUBLICATIONS

U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.

* cited by examiner

SECURE DEVICE COUPLING

TECHNICAL FIELD

The present disclosure relates generally to devices, and more particularly, to secure device coupling.

BACKGROUND

Wireless mechanisms have been employed in a variety of products, including, for example, network attached devices found in a household and/or a building (e.g., the operation of security devices, operation televisions, starting an appliance, etc.). In such products, a paring between a network management device (e.g., a signaler such as a computing device, circuitry, and/or a control panel) and the network attached device (e.g., the operation mechanism of the device) can be used to add security to the process.

Threats from hackers or other malicious users, however, can affect the security of the communication between the network attached device and the network management device. Such threats can include man-in-the-middle (MITM) attacks, among others, and can cause significant financial loss and/or present significant safety and/or security issues. For instance, a hacker or other malicious user can use an MITM attack to gain unauthorized access to (e.g., break into, configure the operation of, and/or steal) a device.

DETAILED DESCRIPTION

Figure 1:
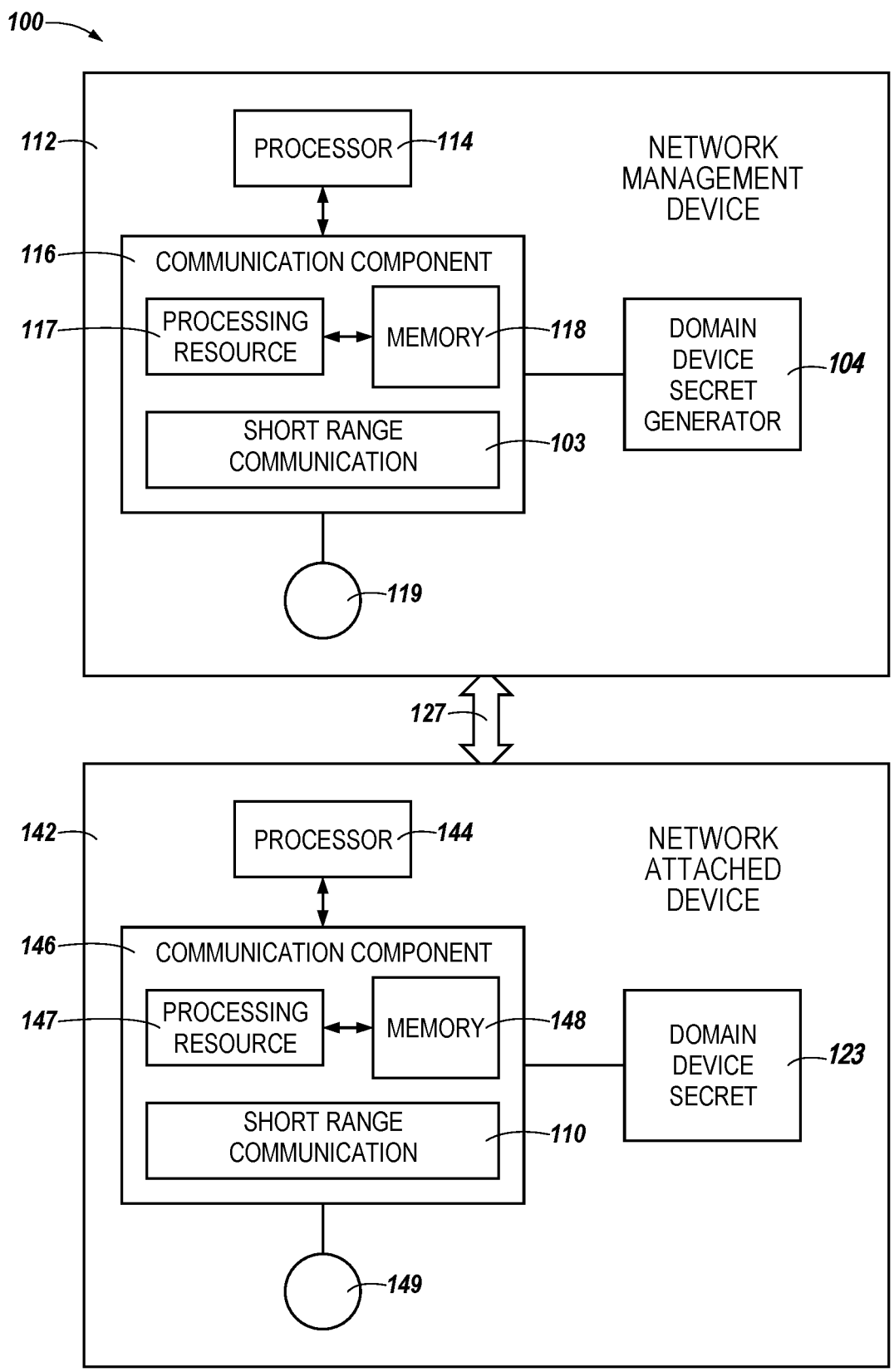
FIG. 1 is a block diagram of a system for secure device coupling in accordance with an embodiment of the present disclosure.

The present disclosure includes apparatuses, methods, and systems for secure device coupling. An embodiment includes a processing resource, memory, and a network management device communication component configured to, in response to identification of at least one network attached device within a domain, generate a domain device secret corresponding to the domain. Each network attached device within the domain can share the same domain device secret. A number of coupling iterations can be performed for each network attached device within the domain. Each respective coupling iterations can include generating a network management device private key and a network management device public key. Providing, via short-range communication, the network management device public key and the domain device secret corresponding to the domain that includes the network attached device to a network attached device communication component included in each network attached device, and receiving, via short-range communication, a network attached device public key and data from the network attached device communication component. In response to providing the network management device public key to the network attached device communication component.

Many threats from hackers or other malicious users can affect the secure device coupling. For example, a hacker or other malicious user may attempt to perform activities, such as, for instance, a man-in-the-middle (MITM) attack, to monitor, interfere with, and/or intercept wireless communications between a network management device coupled to network attached devices, for malicious purposes. One example of an MITM attack is a replay attack, in which a transmission may be recorded (e.g., using a radio receiver in proximity to the network attached device) and then replayed in the future to achieve an unauthorized action of the network attached device. Such hacking activities can cause significant financial loss and/or present significant safety and/or security issues. For instance, a hacker or other malicious user can use an MITM attack to gain unauthorized access to a home and/or a building (e.g., break into and/or steal items) by fraudulently communicating with network attached devices that may secure the home or building.

Secure device coupling can ensure the secure access to specific devices within particular domains. For instance, network attached devices can be assigned to domains by a network management device such that they can be securely coupled to the network management device using a domain device secret assigned to the domain. The initial coupling of network attached devices to the network management device can ensure that communication operations are executed by an authorized network management device and/or user. The network management device can create the domain device secret and assign it to a domain such that an authorized network management device and/or user can securely communicate and control the operations of network attached devices within the domain.

As used herein, a domain may refer to an area of an environment (e.g., a home or a building) or a category of network attached devices within an environment. For instance, network attached devices included in a particular domain may be related to the security devices of a building (e.g., building alarm, motion sensors, etc.) which may be physically located in multiple areas of an environment or physically located in a particular location of an environment. A domain may be identified by a network identifier (e.g., LAN identifier or other wireless network protocol identifier) . A different domain may include network attached devices physically located in a particular location (e.g., a particular floor or room in a home and/or building) or physically located in multiple areas of an environment. A domain may be assigned a domain device secret by the network management device to couple each network attached device within the domain to the network management device such that the operations of the network attached devices within the domain (e.g., security devices) can be securely operated using the domain device secret each network attached device has in common within the domain. The domain selection and the secure device coupling may be accomplished using a short-range communication such as near field communication, and after the network attached devices have been securely coupled, operations commands may be executed using a wireless network.

To ensure that coupling operations between a network management device and a network attached device are secure in order to prevent unauthorized coupling. Previous mechanisms used to couple devices to a network management device may have included using a wireless network to perform coupling operations between the network attached device and the network management device. This approach may cause security concerns where a malicious device can transmit operation instructions to network attached devices causing security and safety concerns.

To address the security problem presented by such unauthorized coupling, short-range communication may be used to exchange a domain device secret corresponding to the domain and complete an exchange of public keys and certificates. Short-range communication may be Radio-Frequency Identification (RFID), Near Field Communication (NFC), Bluetooth, Bluetooth Low Energy, EnOcean, wireless connection technology (e.g., Wi-Fi), Wi-SUN Field Area Networks, and/or a cable connection between the network attached device and a network management device. The domain device secret and the public keys exchanged via short-range communication are used to encrypt any further communications (e.g., operations of the network attached devices within the respective domains). The secure coupling to transfer of public keys and domain device secrets are used future communications (e.g., operations) of the network attached devices.

Further, embodiments of the present disclosure can utilize a device identification composition engine-robust internet of things (DICE-RIOT) protocol to further achieve a secure communication between the network management device and network attached devices by guaranteeing, for instance, the mutual authentication of the network management device and the network attached device, the correctness of the message being communicated, and/or the attestation of data stored in the network management device and network attached devices. Such a DICE-RIOT protocol can be implemented using the existing circuitry (e.g., the existing hardware and/or firmware) of the network management device and network attached devices, without having to add additional (e.g., new) components or circuitry dedicated specifically to the secure communication functionality. Embodiments of the present disclosure can achieve a secure coupling between the network management device and network attached devices without increasing the size, complexity, and/or cost of the network management device and/or device circuitry and can be compatible with any network management device or devices that implements such a DICE-RIOT protocol.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", "P", "M", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 is a block diagram of a system 100 for secure device coupling in accordance with an embodiment of the present disclosure. For instance, as shown in FIG. 1, system 100 can include a network management device apparatus (e.g., a server, circuitry, a computing device, etc.) 112, and a network attached device apparatus (e.g., a home and/or building device) 142. Network attached device apparatus 142 and network management device 112 can communicate wirelessly with each other via wireless link 127, as illustrated in FIG. 1.

Network management device 112 can be a network management device running on a server or another computing device, such as, for instance, a control panel with home/building software, and/or another type of computing device which includes software/hardware that may communicate with devices within an environment. Network attached device 142 can be home/building appliances and devices, Internet of Things (IoT) enabled device, such as, for instance, an automotive (e.g., vehicular and/or transportation infrastructure) IoT enabled device or a medical (e.g., implantable and/or health monitoring) IoT enabled device, an automatic teller machine (ATM). Additionally, some examples, of devices 142 may be security equipment (e.g., motion sensors, locks, surveillance cameras, etc.), kitchen related appliances (e.g., blenders, refrigerators, freezers, ovens, etc.), heating/cooling equipment (e.g., air-conditioning units, fans, HVAC equipment), and/or entertainment devices (e.g., televisions, tablets, phablets, laptops, computers, smart watches, etc.). An interface for the network management device 112, such as, for instance, an interactive panel, that can be used to communicate and operate the network attached device 142 (e.g., lock/unlock a door, operate a television, etc.) will be further described herein.

The network management device 112 can participate in a secure device coupling for multiple devices (e.g., network attached device 142) within an environment. As used herein, the term environment refers to an area which may be partitioned into multiple domains. Domains within environments can include multiple devices capable of communicatively coupling to each other and other computing devices. An example of an environment may be a residential dwelling such as a home, or an apartment complex including multiple residential dwellings, and/or a motel/hotel with temporary lodging configurations. Another example of an environment may be an area including multiple buildings (e.g., a collage campus), particular building such as an office building with multiple offices, a transportation center (e.g., an airport or a train station), and/or a shopping center with multiple shops.

Domains within an environment can be determined based on the devices to be included in the domain. For example, domains can be determined by the type of device, physical location of the devices, accessibility of the devices, and/or a user and/or entity to control the devices. The network management device 112 may monitor an environment and assign devices within the environment to domains. The network management device 112 may execute instructions to identify devices to be included in a particular domain.

Devices (e.g., network attached devices) can be categorized according to the location of the device in the environment. For example, a set of devices located in a particular room of a home (e.g., the kitchen) may be grouped together into a first domain. Although the example of a kitchen is used herein, other categories are contemplated e.g., floors of a building, type of device, security access of a device, users of a device etc. For instance, a second domain may be all devices related to the security of the environment, and a third domain may be all devices associated with a particular user/entity.

Although the examples described herein involve a network management device, other systems, such as a server and/or mobile computing devices, could be used with the home/building devices and techniques described herein.

As shown in FIG. 1, network management device 112 can include a processing resource (e.g., processor) 114 coupled to a network management device communication component 116, such as a reader, writer, transceiver, and/or other computing device or circuitry capable of performing the functions described below, that is coupled to (e.g., or includes) an antenna 119. Network management device communication component 116 can include a processing resource 117 coupled to a memory 118, such as a non-volatile flash memory, although embodiments are not so limited. Memory 118 can include instructions executable by processing resources 114 and/or 117. In an embodiment, network management device communication component 116 and/or processor 114 of the network management device 112 can be part of an on-board computer server and/or a control panel for a device (e.g., or multiple devices) of an environment.

As shown in FIG. 1, network attached device 142 can include a processor 144 coupled to a network attached device communication component 146, such as a reader, writer, transceiver, and/or other computing device or circuitry capable of performing the functions described below, that is coupled to (e.g., or includes) an antenna 149. Network attached device communication component 146 can include a processing resource 147 coupled to a memory 148, such as a non-volatile flash memory, although embodiments are not so limited. Memory 148 can include instructions executable by processing resources 144 and/or 147.

Antenna 149 of network attached device 142 can be in communication with (e.g., communicatively coupled to) antenna 119 of network management device 112 via wireless link 127. In an example, network attached device 142 and/or network management device 112 can include a number of wireless communication devices, such as transmitters, transponders, transceivers, or the like. As an example, the network attached device communication component 146 and/or network management device communication component 116 can be such a wireless communication device. Wireless communication that can be used for secure device coupling can include NFC tags, RFID tags, Bluetooth Low Energy, or the like. In an embodiment, wireless communication can be performed using non-volatile storage components that can be respectively integrated into chips, such as microchips. Each of the respective chips can be coupled to a respective antenna 149 and 119.

As mentioned, wireless communication devices can be short-range wireless communication devices, and in at least one embodiment, wireless communication devices can include non-volatile storage components that can be respectively integrated into chips, such as microchips. Each of the respective chips can be coupled to a respective antenna 119 and 149. The respective storage components can store respective domain and device information.

In some examples, wireless communication devices can be reprogrammable and can be wirelessly reprogrammed in situ. For example, wireless communication devices can be reprogrammed with updated device information to reflect changes to the device, such as location (e.g., geographic and/or home/building locations), accessibility information (e.g., users permitted to use and/or make changes to the device), or the like. For examples in which the short-range communication devices 103 and 110 are NFC tags, a wireless device with NFC capabilities and application software that allows the device to reprogram the NFC tags can be used to reprogram the NFC tags.

For examples in which wireless communication devices are NFC tags, network management device communication component 116 can be an NFC reader and can communicate with wireless communication devices using an NFC protocol that can be stored in memory 118 for processing by processing resource 117. For example, network management device communication component 116 and wireless communication devices can communicate at about 13.56 mega-Hertz according to the ISO/IEC 18000-3 international standard for passive RFID for air interface communications. For example, the information can be transmitted in the form of a signal having a frequency of about 13.56 mega-Hertz.

As shown in FIG. 1, the network management device communication component 116 includes a short-range communication 103 to exchange in secure device coupling via the wireless link 127 with the network attached device 142 illustrated as having a wireless communication devices in the form of short-range communication 110.

As shown in FIG. 1, network management device 112 can include a domain device secret generator 104, and network attached device 142 can include domain device secret 123. The domain device secret generator 104 of the network management device 112 can generate the domain device secret 123 for the network attached device 142. As will be described further herein, the domain device secret 123 can correspond to a domain which includes the network attached device 142. There can be multiple domains within an environment, and each domain may include multiple devices (e.g., the network attached device 142).

The domain device secret generator 104 can generate a domain device secret 123 which corresponds to a domain. Each device (e.g., the network attached device 142) within the domain can receive the domain device secret 123 via a wireless communication (e.g., short-range communication 103 and short-range communication 110). The network management device 112 can generate multiple device secrets (e.g., the domain device secret 123) where each domain device secret 123 generated by the domain device secret generator 104 corresponds to a domain, and each of the devices with in the domain receive the same device secret. Each device with the domain can transmit a different public key to the network management device 112.

For example, secure device coupling can include a number of coupling iterations for each device within a domain. The secure device coupling between the network management device 112 and the network attached device 142 can include the network attached device 142 generating a device private key and a device public key specific to the network attached device 142, providing the device public key and data about the network attached device 142 to the network management device communication component 116 and receiving data (e.g., a conformation of coupling) from the network management device communication component 116 in response to providing the device public key and the data about the network attached device 142 to the network management network attached device communication component 146.

In some embodiments, the network attached device communication component 146 can be configured to encrypt the data about the device using the network management device public key prior to providing the data about the device to the network management device communication component 116. The data about the network attached device 142 can include such metrics as the type of device, make/model number, the physical location, a serial number (or other identifying characteristic, an identifier derived from the serial number, etc.), an associated user or entity, etc.

As will be further described herein in connection with FIGS. 5-10, the domain device secret 123 generated by the domain device secret generator 104 is used by the network management device communication component 116 to generate a Firmware Derivative Secret (FDS) key. The FDS key is used in a DICE-RIOT protocol to validate data. The domain device secret 123 generated by the domain device secret generator 104 and transmitted by the network management device 112 corresponds to a domain. In this way, the domain device secret 123 can be used to control the operation of all of the devices (e.g., the network attached device 142) within a domain. In some embodiments, a domain may be associated with a particular user and/or entity. The domain device secret 123 associated with each domain can be used to securely control the operations of the devices with the domain after the devices are securely coupled. An example of the generation of the network management device and device public and private keys will be further described herein in connection with FIGS. 5-10.

After the devices (e.g., the network attached device 142) within the domain have been securely coupled to the network management device 112, the network management device communication component 116 can encrypt a message using the domain device secret 123 and the device public key. Because the network attached device 142 had been securely coupled to the network management device 112 via short-range communication, the network management device can transmit the encrypted message to the network attached device 142 via a wireless network (e.g., Local Area Network (LAN), Wide Area Network (WAN), etc.). The secure coupling of the devices within the domain include the devices within the domain share the same device secret. Each network attached device within a domain can distinguish, via the network attached device communication component 146, between a command directed to that domain and a command directed to a different domain, this is described further in connection with FIG. 4.

Figure 2:
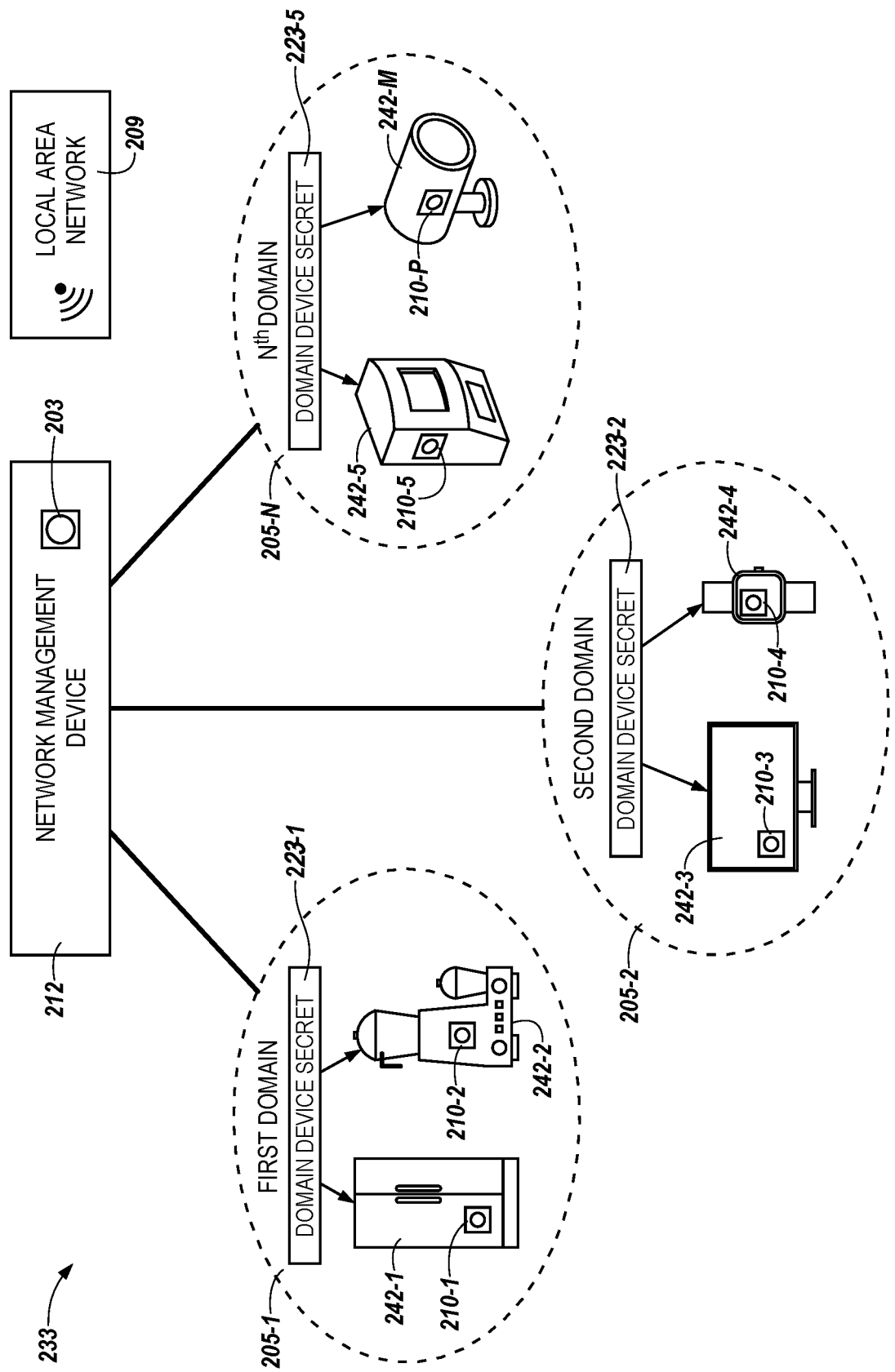
FIG. 2 is an illustration of an environment for secure device coupling between a network management device and network attached devices within an environment in accordance with an embodiment of the present disclosure.

FIG. 2 is an illustration of an environment 293 for secure device coupling between a network management device 212 and devices (e.g., devices 242-1, 242-2, 242-3, 242-4, 242-5, 242-M) within a domain (e.g., domains 205-1, 205-2, and 205-N) in accordance with an embodiment of the present disclosure. Network management device 212 and the devices 242-1, 242-2, 242-3, 242-4, 242-5, 242-M, can be, for instance, network management device 112 and network attached device 142, respectively, previously described in connection with FIG. 1. Each network attached device 242-1, 242-2, 242-3, 242-4, 242-5, and 242-M can include a device processing resource (e.g., the processing resource 147) coupled to a device communication resource (e.g., the device communication resource 146). Secure device coupling can be executed between the network management device 212 and the devices 242-1, 242-2, 242-3, 242-4, 242-5, and 242-M during coupling iterations previously described in connection with FIG. 1.

For example, as shown in FIG. 2, the network management device 212 may monitor an environment 233 for devices (e.g., devices 242-1, 242-2, 242-3, 242-4, 242-5, and 242-M) communicatively coupled to the network management device 212. Environment 233 may include a wireless network such as a Local Area Network (LAN) 209 to transmit commands to the devices 242 via the network management device 212 after the devices 242 have been securely coupled to the network management device via a short-range communication device (e.g., NFC, RFID, etc.). Devices external to the environment 233 (e.g., mobile devices) can communicate with the devices 242-1, 242-2, 242-3, 242-4, 242-5, and 242-M via LAN 209 to transmit commands to the devices 242-1, 242-2, 242-3, 242-4, 242-5, and 242-M, after the devices 242-1, 242-2, 242-3, 242-4, 242-5, and 242-M have been securely coupled to the network management device 212.

The network management device 212 includes short-range communication 203 (or another wireless communication component e.g., RFID, etc.). The network management device 212 can execute instructions via a processor (e.g., the processor 114) and a network management device communication component (e.g., network management device communication component 116) to select devices 242-1, 242-2, 242-3, 242-4, 242-5, and 242-M and partition them into domains 205-1, 205-2, 205-N. The devices 242-1, 242-2, 242-3, 242-4, 242-5, and 242-M selected for each domain 205-1, 205-2, 205-N may be selected based on categories of devices, security access, location, user and/or entity access, etc.

For example, the devices 242-1 and 242-2 may be identified by the network management device 212 for the first domain 205-1 of the environment 233. The devices 242-1 and 242-2 may be of the same device type, (e.g., kitchen appliances, etc.). The devices 242-1 and 242-2 can be in a similar physical location or different physical locations within the environment 233. The devices 242-1 and 242-2 may each include a wireless communication component (e.g., NFC, RFID, etc.) to participate in secure device coupling with the network management device 212. The network attached device 242-1 can include the short-range communication 210-1 and the network attached device 242-2 can include the short-range communication 210-2 to provide the secure exchange of the domain device secret 223-1, and device public and private keys generated by the device processing resource of each network attached device 242-1 and 242-2.

The devices 242-3 and 242-4 may be identified by the network management device 212 for the second domain 205-2 of the environment 233. The devices 242-3 and 242-4 may be of the same device type, (e.g., entertainment devices, etc.). The devices 242-3 and 242-4 can be in a similar physical location or different physical locations within the environment 233. The devices 242-3 and 242-4 may each include a wireless communication component (e.g., NFC, RFID, etc.) to participate in secure device coupling with the network management device 212. The network attached device 242-3 can include the short-range communication 210-3 and the network attached device 242-4 can include the short-range communication 210-4 to provide the secure exchange of the domain device secret 223-2, and device public and private keys generated by the device processing resource of each network attached device 242-3 and 242-4.

The devices 242-5 and 242-M may be identified by the network management device 212 for the Nth domain 205-N of the environment 233. The devices 242-5 and 242-M may be of the same device type, (e.g., security devices, etc.). The devices 242-5 and 242-M can be in a similar physical location or different physical locations within the environment 233. The devices 242-5 and 242-M may each include a wireless communication component (e.g., NFC, RFID, etc.) to participate in secure device coupling with the network management device 212. The network attached device 242-5 can include the short-range communication 210-5 and the network attached device 242-M can include the short-range communication 210-P to provide the secure exchange of the domain device secret 223-S, and respective device public and private keys generated by the device processing resource of each network attached device 242-5 and 242-M.

Although the example of devices 242-1, 242-2, 242-3, 242-4, 242-5, and 242-M partitioned into domains 205-1, 205-2, and 205-N by device type are used herein, other methods are contemplated. In some embodiments, devices can be identified and selected to particular domains based on a user and/or entity which may operate the device. For example, an entity may be in responsible for the operation and control of security for an environment (e.g., the environment 233. The security devices of the environment 233 may be selected for a domain such that they can receive the same device secret and be controlled by the entity.

The network management device 212 performs a coupling iteration for each device within a domain. For example, each coupling iteration can be carried out via NFC and include the network management device 212 may generate a network management device private key, a network management device public key, and a domain device secret (via a domain device secret generator e.g., 104 of FIG. 1) which corresponds to the domain 205-1. Each domain device secret 223-1, 223-2, and 223-S generated is different for each domain 205-1, 205-2, and 205-N. Each device within each respective domain can receive the device secret corresponding to the domain.

For example, the network management device 212 can, via short-range communication 203 transmit the domain device secret 223-1 with the network management device public key to each of the devices 242-1 and 242-2) within the domain 205-1. The network attached device 242-1 receives the domain device secret 223-1 and the network management device public key via short-range communication 210-1. The network attached device 242-2 receives the domain device secret 223-1 and the network management device public key via short-range communication 210-2. Each network attached device 242-1, and 242-2, in response to receiving the domain device secret 223-1 and the network management device public key, can transmit their respective device public keys to the network management device 212 via their respective short-range communication 210-1 and 210-2.

For example, as part of the secure device coupling iteration, the network management device 212 via a network management device communication component, may receive a device public key from network attached device 242-1 via short-range communication 203. Network attached device 242-1 can transmit via short-range communication 210-1 information about the network attached device 242-1 (e.g., make, model, identification, etc.). Further, as part of the secure device coupling iteration, the network management device 212 via a network management device communication component, may receive a device public key from network attached device 242-2 via short-range communication 203. Network attached device 242-2 can transmit via short-range communication 210-2 information about the network attached device 242-2 (e.g., make, model, identification, etc.). The network management device 212, can, via the network management device communication component and short-range communication 203, transmit a conformation generated using the respective device public key and indicating the secure coupling to the network attached device 242-1 and 242-2.

In response to the device being coupled to the network management device, the device communication component of the device (e.g., the network attached device 242-1) decrypt the received conformation using the device private key and verify an identity of the network management device communication component of the network management device 212 and perform an operation. For example, the network attached device 242-1 may perform an operation such as a set up or boot operation.

In some embodiments, a network attached device communication component (e.g., the network attached device communication component 146) can be configured to decrypt the received conformation using the device private key and verify the identity of the network management device communication component of the network management device 212. In response to the verification of the identity of the network management device communication component of the network management device 212, the device may perform an operation. The operation performed may be a set-up operation such that the device is able to receive communications (e.g., commands) external to the environment 233 via the LAN 209.

Further, each respective coupling iteration may take place as described for devices 242-1 and 242-2. For example, the network management device 212 can identify multiple devices other devices within different domains e.g., devices 242-3 and 242-4 within the second domain 205-2 and devices 242-5 and 242-M within the Nth domain 205-N. The network management device 212 can generate a different device secret for each domain, generate domain device secret 223-2 for the second domain 205-2 and 223-S for the Nth domain 205-N.

Secure device coupling using short-range communication and a domain device secret shared by all of the network attached devices within a particular domain can securely ensure the identity between the network management device and the network attached devices coupled to the network management device 212. The domain device secret shared between the network attached devices within a domain can provide the option to associate the network attached devices within the domains to a particular user and/or entity such that only associated users and/or entities can send commands to operate the network attached devices after secure coupling.

For example, the network management device communication component within the network management device 212, can receive an external command for the network attached device 242-1 via the LAN 209 where the command includes domain device secret 223-2. In response to securely coupling the network attached device 242-1 included in the domain 205-1, the network management device 212 can determine the domain device secret 223-1 associated with the first domain 205-1 (which includes the network attached device 242-1), and refrain from encrypting the command received from the LAN using the different (e.g., wrong) domain device secret 223-2. In other words, the different domain device secret 223-2 is associated with the second domain 205-2 which does not include the network attached device 242-1. Thus, the command may not be valid and/or it may have been transmitted form an unauthorized entity.

In some embodiments, a network attached device may refrain from coupling to the network management device 212 when the device secret is not correct (e.g., not the expected device secret). For example, each respective one of the number of coupling iterations can further include a network attached device 242-1 receiving via short-range communication 210-1 a different device secret (e.g., not domain device secret 223-1) generated by the network management device 212, and refrain from coupling to the network management device 212 when the different (e.g., unexpected) device secret is received. In this way, the network attached device 242-1 remains securely associated with the domain device secret 223-1.

Figure 3:
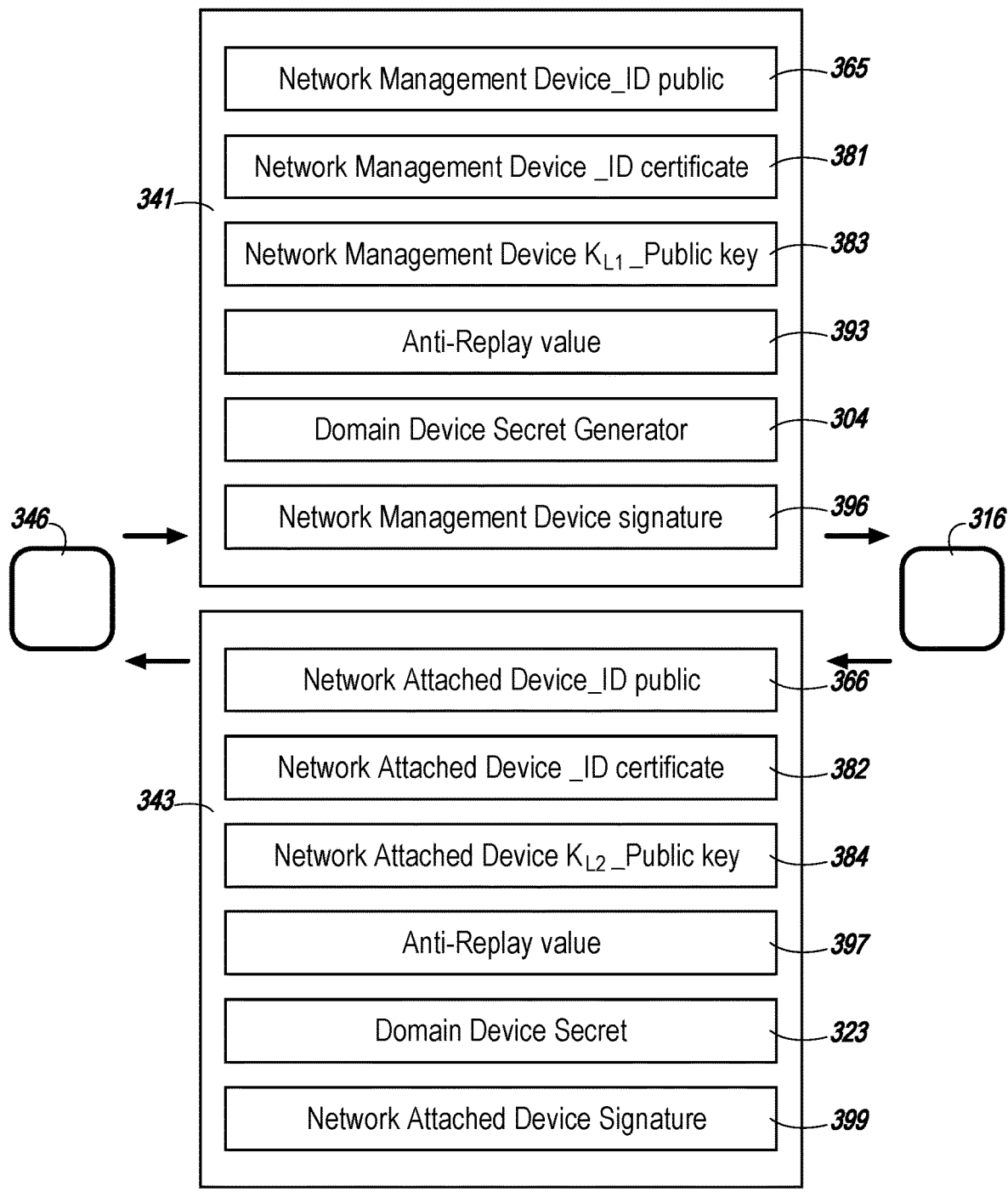
FIG. 3 is an illustration of an exchange of a domain device secret between a network management device and a network attached device in accordance with an embodiment of the present disclosure.

FIG. 3 is an illustration of an exchange of a domain device secret 323 between a network management device (e.g., the network management device 112) and a network attached device (e.g., the network attached device 142) in accordance with an embodiment of the present disclosure. FIG. 3 illustrates the network management device coupling data 341 exchanged via short-range communication with the device coupling data 343 via short-range communication for secure device coupling.

For example, as shown in FIG. 3, network management device coupling data 341 transmitted via short-range communication, network management device communication component 316 to network attached device communication component 346 can include a network management device public identification (Network Management Device_ID public) 365, a network management device certificate (Network Management Device_ID certificate) 381, a network management device public key (Network Management Device $K_{L1}$ Public key) 383, an anti-replay (e.g., freshness) value 393, domain device secret generator 304 (which can generate the domain device secret 323 to transmit to the network attached device communication component 346), and a network management device signature 396. The network management device certificate 381 can be used to verify that the identity of the network management device communication component 316 is authenticated. The network management device public key 383 can be used to encrypt data to be sent to the network management device communication component 316 in order for the network management device communication component 316 to decrypt the received data using its own private key, as will be described further herein.

Anti-replay value 393 can be (e.g., freshness) value can be used to modify each coupling iteration, changing with each iteration. This freshness value can be implemented as a counter (e.g. a monotonic counter), which can be incremented with each iteration. The anti-replay value can be used to encrypt data transmitted for secure device coupling to avoid replay style hacking attacks which may endeavor to couple a device (e.g., a network attached device) to a fraudulent network management device. Further, a unique identity of the network management device, such as a serial number or other identifying data, can be included with the anti-replay value 393.

Network management device signature 396 can be used to verify that the data is sent from an authorized entity such that data with this verifiable signature is from the sender that network management device communication component 316 is claiming to be. Network management device signature 396 can be generated by encrypting the signature using the network management device private key (which is provided only to the network management device) and can be decrypted using the publicly provided network management device public key 383. A further description of the signature verification will be further described herein.

Further, as shown in FIG. 3, coupling data 343 transmitted by network attached device communication component 346, via short-range communication, to network management device communication component 316 can include a network attached device public identification (Network Attached Device_ID public) 366, a network attached device certificate (Network Attached Device_ID certificate) 382, a network attached device public key (Network Attached Device $K_{L2}$ Public key) 384, an anti-replay (e.g., freshness) value 397, and a network attached device signature 399. The network attached device public identification 366 can be used to determine the identity of network attached device communication component 346, and the network attached device certificate 382 can be used to verify that the identity of the network attached device communication component 346 is authenticated. The network attached device public key 384 can be used to encrypt data to be sent to the network attached device communication component 346 in order for the network attached device communication component 346 to decrypt the received data using its own private key, as will be described further herein.

Anti-replay value 397 can be (e.g., freshness) value can be used to modify each coupling iteration, changing with each iteration. This freshness value can be implemented as a counter (e.g. a monotonic counter), which can be incremented with each iteration. The anti-replay value can be used to encrypt data transmitted for secure device coupling to avoid replay style hacking attacks which may endeavor to couple a device to a fraudulent network management device. Further, a unique identity of the device associated with the network attached device communication component 346, such as a serial number or other identifying data, can be included with the anti-replay value 397.

Network attached device signature 399 can be used to verify that the data is sent from an authorized entity such that data with this verifiable signature is from the sender that network attached device communication component 346 is claiming to be. Network attached device signature 399 can be generated by encrypting the signature using the device private key (which is provided only to the device) and can be decrypted using the publicly provided network attached device public key 384. A further description of the signature verification will be further described herein.

Public keys 383 and 384 can be used to encrypt data sent to each respective communication component 316 and 346 and verify the identity of each communication component. As an example, and as will be further described below, network management device communication component 316 can encrypt data using network attached device public key 384 and send the encrypted data to device communication component 346. Likewise, network attached device communication component 346 can encrypt data using network management device public key 383 and send the encrypted data to network management device communication component 316.

Figure 4:
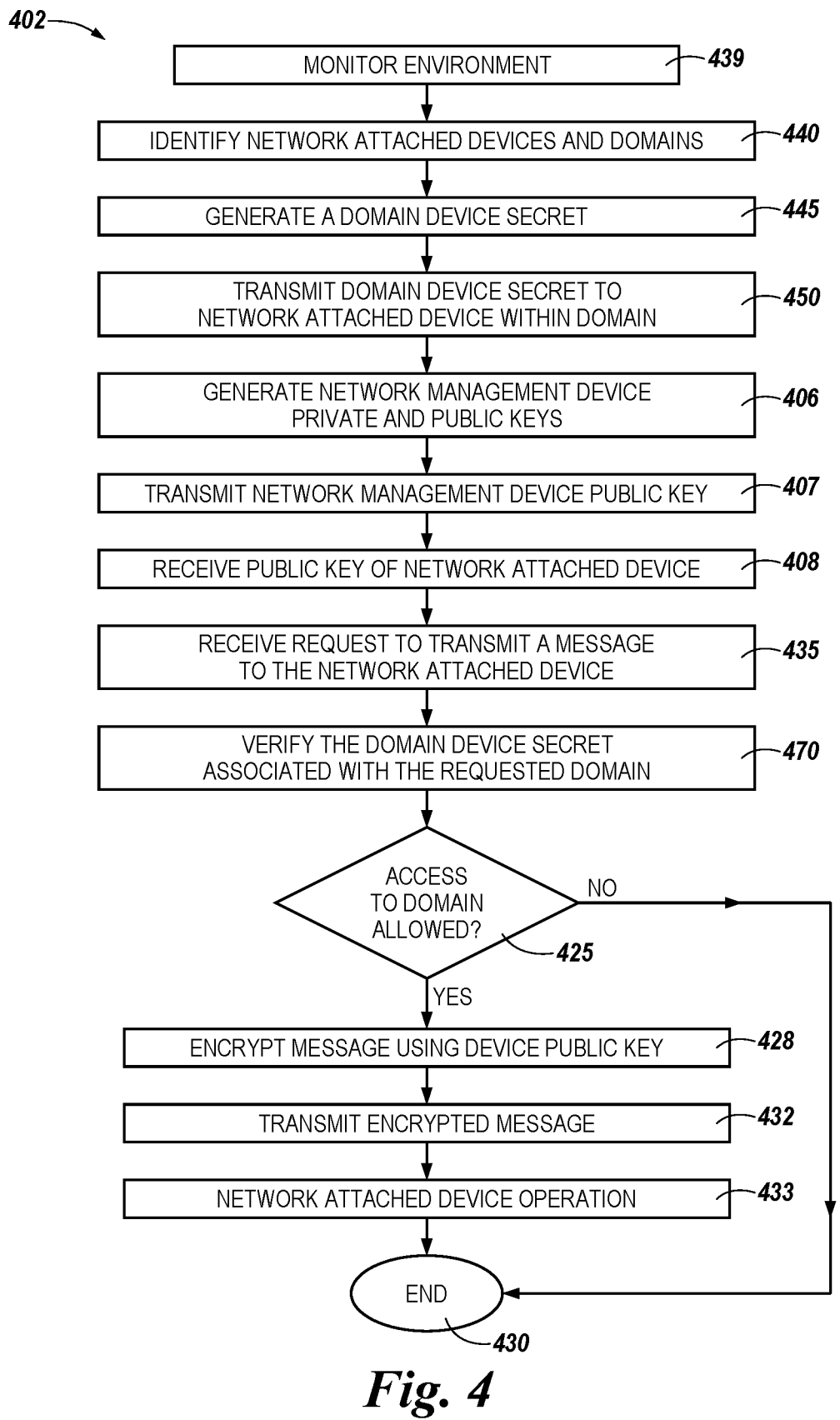
FIG. 4 illustrates a method for secure device coupling in accordance with an embodiment of the present disclosure.

FIG. 4 illustrates a method 402 for secure device coupling in accordance with an embodiment of the present disclosure. The network management device and network attached device can be, for instance, network management device 112 and network attached device 142, respectively, previously described in connection with FIG. 1, and method 402 can be performed by network attached device 142 (e.g., network attached device communication component 146) as previously described in connection with FIG. 1. Method 402 can be performed by network management device 112 (e.g., network management device communication component 116) as previously described in connection with FIG. 1.

At block 439, method 402 includes monitoring, by a network management device using short-range communication short-range communication (e.g., the NFC 103), an environment (e.g., the environment 233) including at least one network attached device (e.g., the network attached devices 242-1, 242-2, 242-3, 242-4, 242-5, and/or 242-M). Monitoring can include a detection by the network management device and/or notification when a new network attached device has been added to the environment.

At block 440, method 402 includes identifying, by the network management device, network attached devices within the environment and assigning the network attached devices to respective domains (e.g., the domains 205-1, 205-2, and/or 205-N). The network attached devices can be categorized into multiple domains by device type, security access, physical location, and/or a user or entity as previously described.

At block 445, method 402 includes generating, by the network management device, a domain device secret (e.g., domain device secret 123 generated by the domain device secret generator 104) for each domain. The domain device secret for each domain is provided to each network attached device within the domain. In other words, each network attached device within each domain includes the same domain device secret. The network management device may include its own device secret that is different from the domain device secrets generated by the network management device. The network management device's device secret may be provided by another entity within or outside the environment. For example, a device secret for the network management device may be provisioned onto the network management device during the manufacturer of the network management device. The communication between the network management device and its device secret is described in connection with FIGS. 5-6.

At block 450, method 402 includes coupling the network management device to each network attached device by transmitting, by the network management device via short-range communication, each generated domain device secret to each network attached device within their respective domains. For example, the network management device can transmit a domain device secret (e.g., domain device secret 223-1) to each network attached device (e.g., network attached devices 242-1, and 242-2) of a first domain (e.g., the first domain 205-1). The network management device can transmit a second domain device secret (e.g., domain device secret 223-2) to each network attached device (e.g., network attached devices 242-3, and 242-4) of a second domain (e.g., the second domain 205-2). The network management device can transmit a third domain device secret (e.g., domain device secret 223-S) to each network attached device (e.g., network attached devices 242-5, and 242-M) of a Nth domain (e.g., the Nth domain 205-N).

At block 406, method 402 includes generating a network management device public key (e.g., the network management device $K_{L1}$_Public Key 383) and a network management device private key and transmitting via short-range communication the network management device public key to each network attached device within its respective domain. For example, at block 407, method 402 includes the network management device may transmit its network management device public key to each network attached device within a domain, via short-range communication.

At block 408, method 402 includes receiving, via short-range communication, a network attached device public key (e.g., the Network Attached Device $K_{L1}$_Public Key 384) from each network attached device within their respective domains. The secure device coupling via short-range communication includes each device producing and transmitting its own public and private device keys and receiving a domain device secret from the network management device that is common to all network attached devices within each domain.

At block 435, method 402 includes receiving, by the network management device, a request to transmit a message to a network attached device. In some embodiments, the request may be received from a device located external to the environment. For example, the request may be received from a mobile device associated with a user, and the request may be received via a LAN (e.g., the LAN 209) or another wireless platform. The network management device can verify that the user is authorized to send and receive commands (e.g., messages) to the network attached device.

At block 470, method 402 includes verifying the domain device secret is associated with the requested domain containing the network attached device. In other words, the network management device may determine if the domain device secret associated with the request is the same as the domain device secret that corresponds to the domain that includes the particular network attached device.

At block 425, method 402 includes determining if the user/entity associated with the request is allowed to communicate with the network attached device. If the domain device secret associated with the request is not the same as the domain device secret of the domain including the device requested, then the communication ends at block 430 of method 402.

If the domain device secret associated with the request is the same as the domain device secret associated with the domain that includes the network attached device, at block 428, method 402 includes encrypting the message of the request using the public key of the network attached device. The network management device may utilize the LAN included in the environment to transmit the encrypted message to the network attached device.

At block 432, method 402 includes transmitting the encrypted message to the network attached device. The device can decrypt the message using the device private key to perform the operation included in the message. At block 433, method 402 include operating the network attached device based on the contents of the decrypted message.

Figure 5:
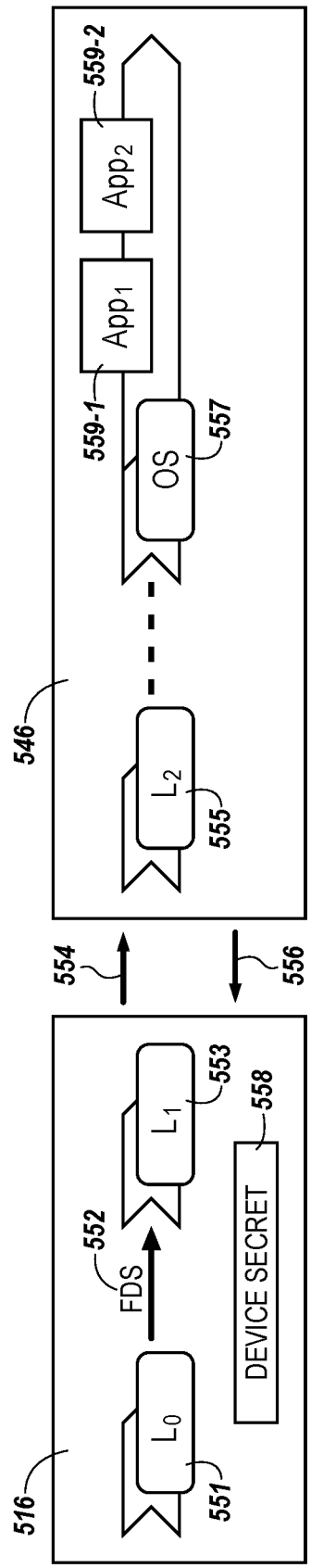
FIG. 5 is a block diagram of an example system including a network management device communication component and a network attached device communication component in accordance with an embodiment of the present disclosure.

FIG. 5 is a block diagram of an example system including a network management device communication component 516 and a network attached device communication component 546 in accordance with an embodiment of the present disclosure. Network management device communication component 516 and network attached device communication component 546 can be, for example, network management device communication component 116 and network attached device communication component 146 previously described in connection with FIG. 1.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers.

As is illustrated in FIG. 5, Layer 0 ("L$_0$") 551 and Layer 1 ("L$_1$") 553 are within the network management device communication component 516. Layer 0 551 can provide an FDS key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be provided to the network management device communication component by another computing device (e.g., during manufacturing of the network management device) to be used in generating the FDS. A device secret 558 can be used to create the FDS 552 and be stored in memory of the network management device communication component 516, such that FDS 552 is unique to network management device communication component 516.

Although not illustrated in FIG. 5 as to not obscure examples of the disclosure, the network management device may include a domain device secret generator (e.g., the domain device secret generator 104 to generate domain device secret 123, as discussed in FIG. 1). The network attached device communication component 546 can receive a domain device secret from the domain device secret generator and participate in communication as illustrated by arrow 556 and discussed below.

The network management device communication component 516 can transmit data, as illustrated by arrow 554, to the network attached device communication component 546. The transmitted data can include a network management device identification that is public (e.g., 365 in FIG. 3), a certificate (e.g., a network management device identification certificate 381), a network management device public key (e.g., 383), and/or a domain device secret generator (e.g., the domain device secret generator 304 of FIG. 3 to generate the domain device secret 323). Layer 2 ("L$_2$") 555 of the network attached device communication component 546 can receive the transmitted data and execute the data in operations of the operating system ("OS") 557 and on a first application 559-1 and a second application 559-2.

In an example operation, the network management device communication component 516 can read the device secret 558, hash an identity of Layer 1 553, and perform a calculation including:

$$K_{L1} = KDF[Fs(s), Hash("immutable information")]$$

where $K_{L1}$ is a network management device public key, KDF (e.g., KDF defined in the National Institute of Standards and Technology (NIST) Special Publication 800-108) is a key derivation function (e.g., HMAC-SHA256), and Fs(s) is the network attached device secret 558. FDS 552 can be determined by performing:

$$FDS = HMAC\text{-}SHA256[Fs(s), SHA256("immutable information")]$$

Likewise, the network attached device communication component 546 can transmit data, as illustrated by arrow 556, including a network attached device identification that is public (e.g., network attached device public identification 366), a certificate (e.g., a network attached device identification certificate 382), and/or a network attached device public key (e.g., network attached public key 384), and a network attached device secret (e.g., the domain device secret 323 of FIG. 3) corresponding to the device domain (e.g., the domain 223-1, 223-2, 223-N) provided to the network attached device.

Figure 6:
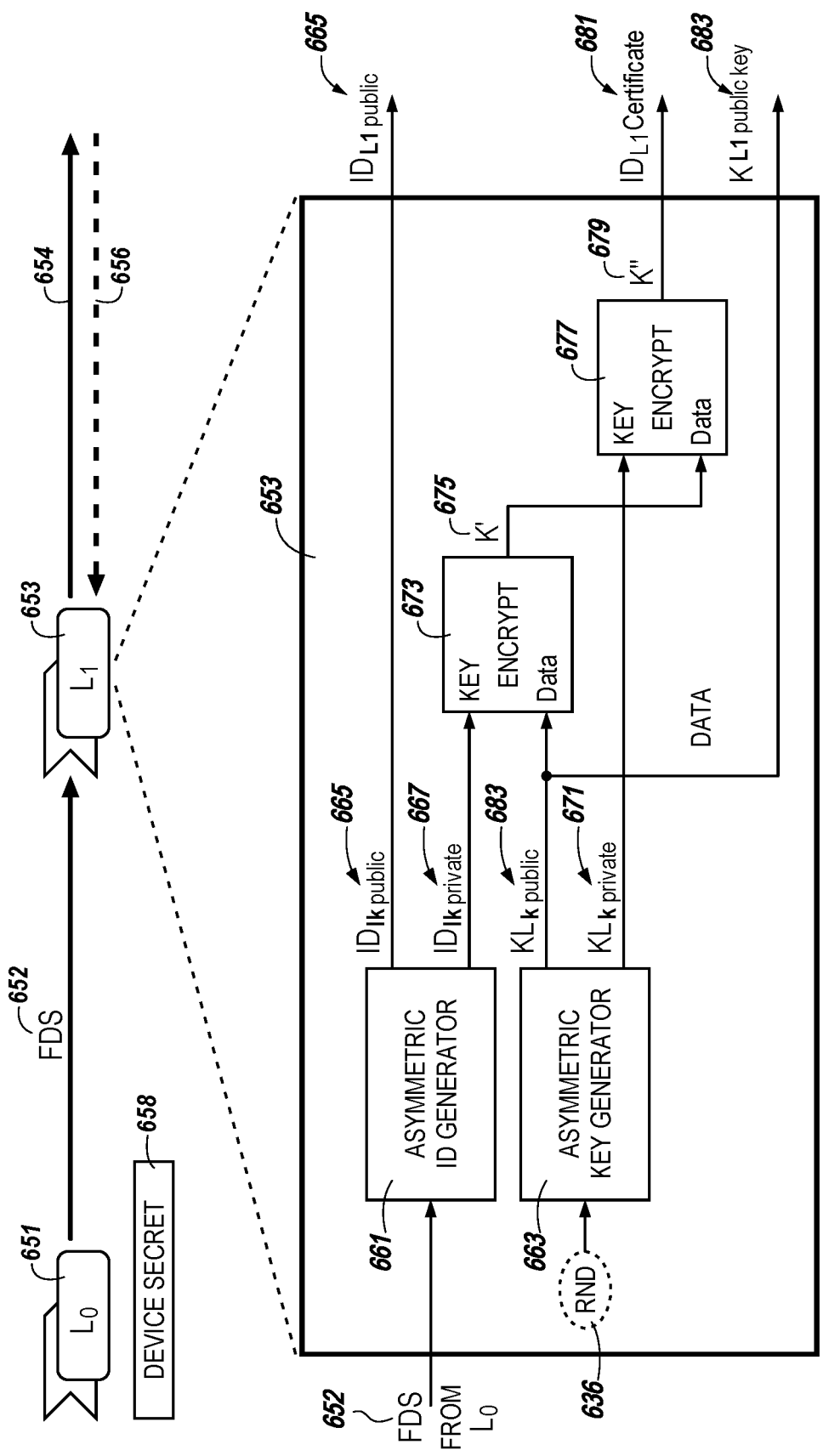
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the network management device public identification, the network management device certificate, and the network management device public key that are then sent, indicated by arrow 654, to Layer 2 (e.g., Layer 2 555) of a network attached device communication component (e.g., 546 in FIG. 5). Layer 0 ("L$_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("ID$_{lk\ public}$") 665 and a private identification 667. In the abbreviated "ID$_{lk\ public}$," the "lk" indicates Layer k (in this example Layer 1), and the "public" indicates that the identification is openly shared. The public identification ("ID$_{L1public}$") 665 is illustrated as shared by the arrow extending to the right and outside of Layer 1 653 of the network management device communication component. The generated private identification 667 is used as a key input into an encryptor 673. The encryptor 673 can be any processor, computing device, etc. used to encrypt data.

Layer 1 653 of a network management device communication component can include an asymmetric key generator 663. In at least one example, a random number generator (RND) 636 can optionally input a random number into the asymmetric key generator 663. The asymmetric key generator 663 can generate a public key ("K$_{Lk\ public}$") 683 (referred to as a network management device public key) and a private key ("K$_{LK\ private}$") 671 (referred to as a network management device private key) associated with a network management device communication component such as network management device communication component 516 in FIG. 5. The network management device public key 683 can be an input (as "data") into the encryptor 673. The encryptor 673 can generate a result K' 675 using the inputs of the network management device private identification 667 and the network management device public key 683. The network management device private key 671 and the result K' 675 can be input into an additional encryptor 677, resulting in output K" 679. The output K" 679 is the network management device certificate ("ID$_{L1}$ certificate") 681 transmitted to the Layer 2 (555 of FIG. 5). The network management device certificate 681 can provide an ability to verify and/or authenticate an origin of data sent from the network management device communication component. As an example, data sent from the network management device communication component can be associated with an identity of the network management device communication component by verifying the certificate, as will be described further in association with FIG. 8. Further, the network management device public key ("K$_{L1\ public\ key}$") 683 can be transmitted to Layer 2. Therefore, the public identification 665, the certificate 681, and the public key 683 of a Layer 1 653 of a network management device communication component can be transmitted to Layer 2 of a network attached device communication component.

Figure 7:
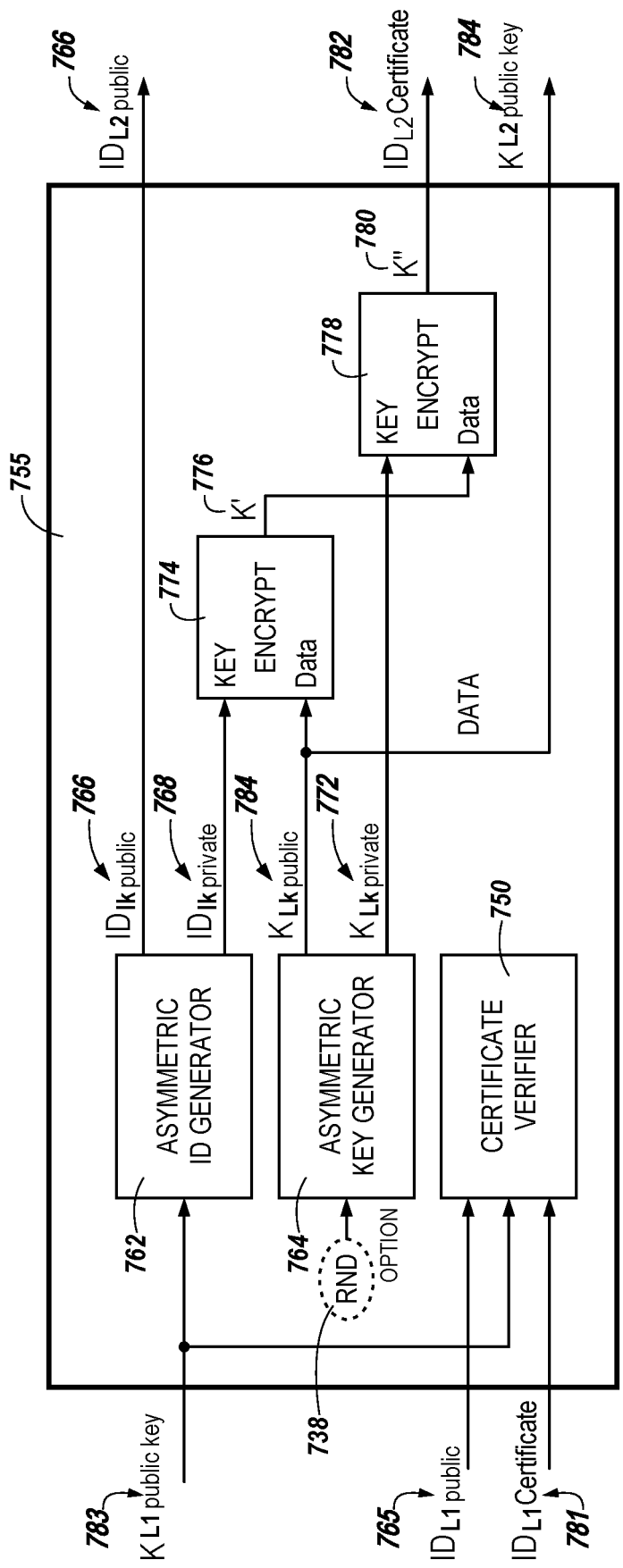
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a network attached device communication component (e.g., network attached device communication component 546 in FIG. 5) generating a device identification ("$ID_{L2\ public}$") 766, a device certificate ("$ID_{L2}$ Certificate") 782, and a device public key ("$K_{L2\ public\ key}$") 784.

The network management device public key ("$K_{L1\ public\ key}$") 783 transmitted from Layer 1 of the network management device communication component to Layer 2 755 of a network attached device communication component, as described in FIG. 6, is used by an asymmetric ID generator 762 of the network attached device communication component to generate a public identification ("$ID_{lk\ public}$") 766 and a private identification 768 of the network attached device communication component. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the network management device certificate 781 and public identification 765, along with the network management device public key 783, are used by a certificate verifier 750. The certificate verifier 750 can verify the network management device certificate 781 received from the network management device communication component, and determine, in response to the network management device certificate 781 being verified or not being verified, whether to accept or discard data received from the network management device communication component. Further details of verifying a device certificate 782 are further described herein (e.g., in connection with FIG. 9).

Layer 2 755 of the network attached device communication component can include an asymmetric key generator 764. In at least one example, a random number generator (RND) 638 can optionally input a random number into the asymmetric key generator 764. The asymmetric key generator 764 can generate a public key ("$K_{Lk\ public}$") 784 (referred to as a device public key) and a private key ("$K_{LK\ private}$") 772 (referred to as a device private key) associated with a network attached device communication component such as network attached device communication component 546 in FIG. 5. The device public key 784 can be an input (as "data") into the encryptor 774. The encryptor 774 can generate a result K' 776 using the inputs of the device private identification 768 and the device public key 784. The device private key 772 and the result K' 776 can be input into an additional encryptor 778, resulting in output K" 780. The output K" 780 is the device certificate ("$ID_{L2}$ certificate") 782 transmitted back to the Layer 1 (553 of FIG. 5). The device certificate 782 can provide an ability to verify and/or authenticate an origin of data sent from the network attached device communication component. As an example, data sent from the network attached device communication component can be associated with an identity of the network attached device communication component by verifying the certificate, as will be described further in association with FIG. 8. Further, the device public key ("$K_{L2\ public\ key}$") 784 can be transmitted to Layer 1. Therefore, the public identification 766, the certificate 782, and the device public key 784 of the network attached device communication component can be transmitted to Layer 1 of a network management device communication component.

In an example, in response to a network attached device communication component receiving a public key from a network management device communication component, the network attached device communication component can encrypt data to be sent to the network management device communication component using the network management device public key. Vice versa, the network management device communication component can encrypt data to be sent to the network attached device communication component using the device public key. In response to the network attached device communication component receiving data encrypted using the device public key, the network attached device communication component can decrypt the data using its own device private key. Likewise, in response to the network management device communication component receiving data encrypted using the network management device public key, the network management device communication component can decrypt the data using its own network management device private key. As the device private key is not shared with another device outside the network attached device communication component and the network management device private key is not shared with another device outside the network management device communication component, the data sent to the network attached device communication component and the network management device communication component remains secure.

Figure 8:
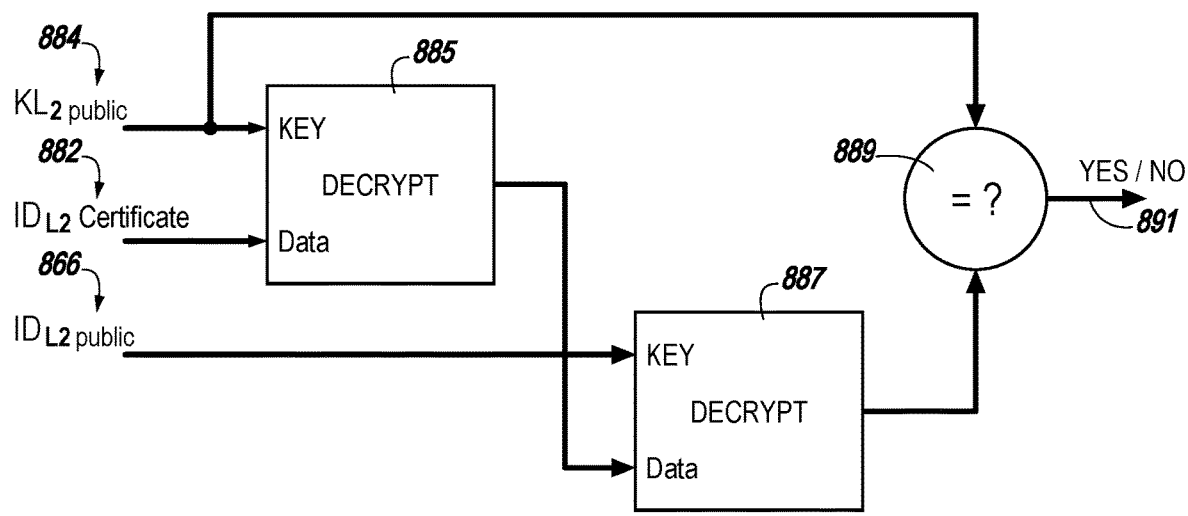
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 884, a certificate 882, and a public identification 866 is provided from a network attached device communication component (e.g., from Layer 2 555 of network attached device communication component 546 in FIG. 5). The data of the certificate 882 and the device public key 884 can be used as inputs into a decryptor 885. The decryptor 885 can be any processor, computing device, etc. used to decrypt data. The result of the decryption of the certificate 882 and the device public key 884 can be used as an input into a secondary decryptor 887 along with the public identification 866, result in an output. The device public key 884 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
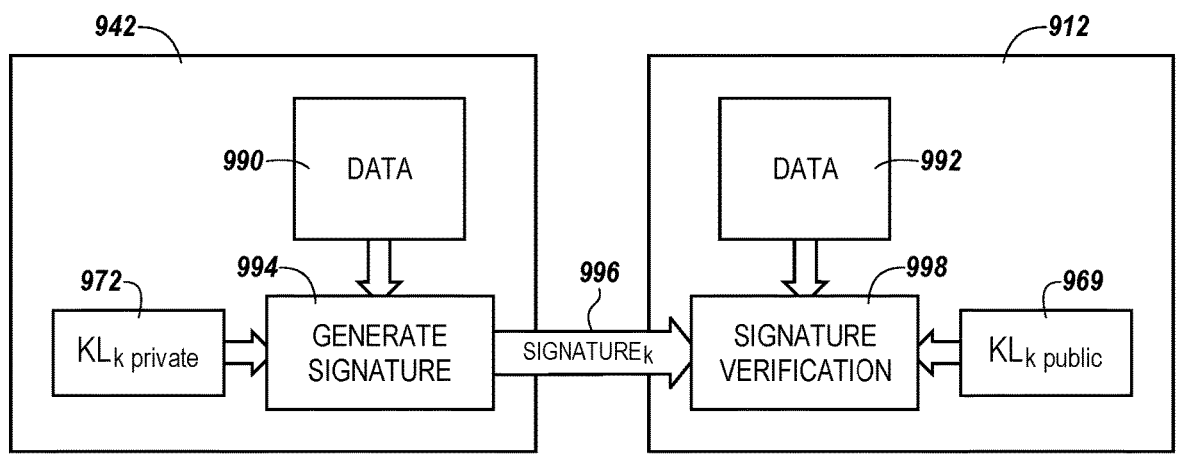
FIG. 9 is a block diagram of an example process to verify a signature an accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A device 942 (such as network attached device 142 in FIG. 1) can send data 990 to a network management device 912 (such as network management device 112). The device 942 can generate, at 994, a signature 996 using a device private key 972. The signature 996 can be transmitted to the network management device 912. The network management device 912 can verify, at 998, using data 992 and the network management device public key 969. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the network management device can verify the digital signature by using an internal cryptography process (e.g., Elliptical Curve Digital signature (ECDSA) or a similar process.

Figure 10:
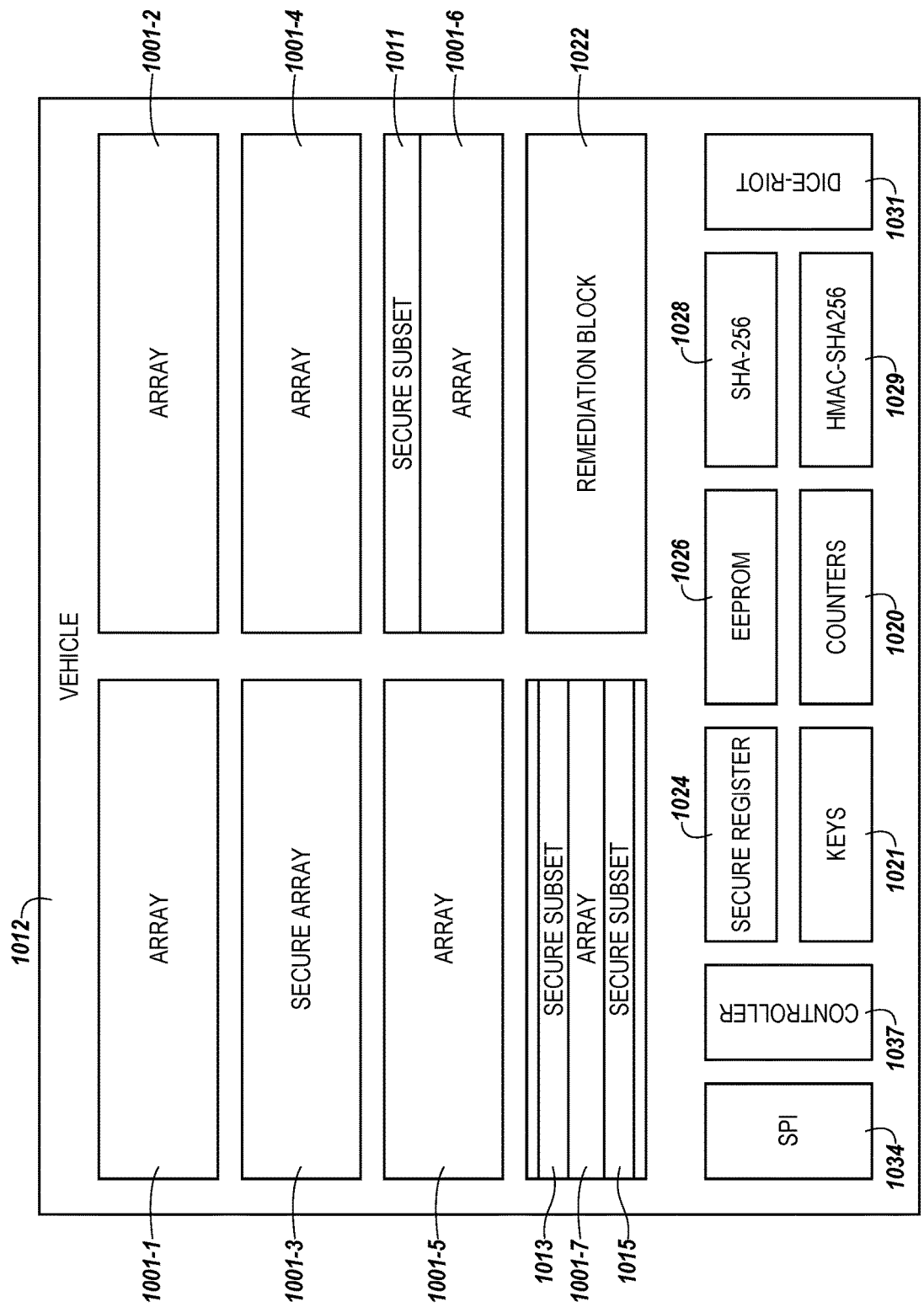
FIG. 10 is a block diagram of an example network management device apparatus in accordance with an embodiment of the present disclosure.

FIG. 10 is a block diagram of an example network management device apparatus (e.g., network management device) 1012 in accordance with an embodiment of the present disclosure. Network management device 1012 can be, for example, network management device 112 previously described in connection with FIG. 1.

As shown in FIG. 10, network management device 1012 can include a number of memory arrays 1001-1 through 1001-7. Further, in the example illustrated in FIG. 10, memory array 1001-3 is a secure array, subset 1011 of memory array 1001-6 comprises a secure array, and subsets 1013 and 1015 of memory array 1001-7 comprise a secure array. As used herein, a secure portion of a memory, such as, for instance, a secure array, can refer to an area of the memory to be kept under control, and/or an area of the memory that stores sensitive (e.g., non-user) data, such as host firmware and/or code to be executed for sensitive applications. Subsets 1011, 1013, and 1015 can each include, for instance, 4 kilobytes of data. However, embodiments of the present disclosure are not limited to a particular number or arrangement of memory arrays or secure arrays.

As shown in FIG. 10, network management device 1012 can include a remediation (e.g., recovery) block 1022. Remediation block 1022 can be used as a source of data in case of errors (e.g., mismatches) that may occur during operation of network management device 1012. Remediation block 1022 may be outside of the area of network management device 1012 that is addressable by a host.

As shown in FIG. 10, network management device 1012 can include a serial peripheral interface (SPI) 1034 and a network management device 1037. Network management device 1012 can use SPI 1034 and network management device 1037 to communicate with a host and memory arrays 1001-1 through 1001-7.

As shown in FIG. 10, network management device 1012 can include a secure register 1024 for managing the security of network management device 1012. For example, secure register 1024 can configure, and communicate externally, to an application network management device. Further, secure register 1024 may be modifiable by an authentication command.

As shown in FIG. 10, network management device 1012 can include keys 1021. For instance, network management device 1012 can include eight different slots to store keys such as the network management device public and private keys previously described herein, root keys, DICE-RIOT keys, and/or other external session keys.

As shown in FIG. 10, network management device 1012 can include an electronically erasable programmable read-only memory (EEPROM) 1026. EEPROM 1026 can provide a secure non-volatile area available for a host, in which individual bytes of data can be erased and programmed.

As shown in FIG. 10, network management device 1012 can include counters (e.g., monotonic counters) 1020. Counters 1020 can be used as an anti-replay mechanism (e.g., freshness generator) for secure communications between network management device 1012 and a device, as previously described herein. For instance, counters 1020 can include counters 120-1 and 120-2 previously described in connection with FIG. 1.

As shown in FIG. 10, network management device 1012 can include a SHA-256 cryptographic hash function 1028, and/or an HMAC-SHA256 cryptographic hash function 1029. SHA-256 and/or HMAC-SHA256 cryptographic hash functions 1028 and 1029 can be used by network management device 1012 to generate cryptographic hashes, such as, for instance, run-time cryptographic hashes as previously described herein, and/or golden hashes used to validate the data stored in memory arrays 1001-1 through 1001-7. Further, network management device 1012 can support L0 and L1 of DICE-RIOT 1031.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a processing resource;
 memory having instructions executable by the processing resource; and
 a network management device communication component coupled to the processing resource, wherein the network management device communication component is configured to, in response to identification of a network attached device within a first domain:
  generate a domain device secret corresponding to the first domain, wherein the network attached device within the first domain shares the domain device secret with another network attached devices included in the first domain;

perform a number of coupling iterations for each network attached device within the first domain, wherein each respective one of the number of coupling iterations includes:

generating a network management device private key and a network management device public key;

providing, via short-range communication, the network management device public key and the domain device secret corresponding to the first domain to a network attached device communication component included in each network attached device of the first domain;

receiving, via short-range communication, a network attached device public key from each network attached device within the first domain and data from the network attached device communication component in response to providing the network management device public key to the network attached device communication component;

identifying multiple network attached devices within a second domain; and generating a different domain device secret for the second domain, wherein the different domain device secret is provided to each network attached device within the second domain.

2. The apparatus of claim 1, wherein the network management device communication component is configured to, in response to coupling to the network attached device included in the first domain, encrypt a message using the domain device secret and the network attached device public key.

3. The apparatus of claim 2, wherein the network management device communication component is configured to transmit the encrypted message to the network attached device via a Local Area Network (LAN).

4. The apparatus of claim 1, wherein the network attached device communication component is configured to, prior to providing the data to the network management device communication component, encrypt the data using the network management device public key.

5. The apparatus of claim 1, wherein each domain device secret is associated with a user to control network attached devices included in the first domain associated with the domain device secret.

6. The apparatus of claim 1, wherein each network attached device of the second domain transmits a different network attached device public key to the network management device, via short-range communication.

7. The apparatus of claim 1, wherein the network attached devices included in the first domain are Internet of Things (IoT) devices.

8. The apparatus of claim 1, wherein the network management device communication component is part of a device control panel used to monitor the network attached devices included in the first domain.

9. The apparatus of claim 1, wherein the network management device communication component is configured to, in response to coupling to the network attached device included in the first domain:

determine the domain device secret associated with the first domain; and refrain from encrypting messages for the network attached device using a different domain device secret.

10. The apparatus of claim 9, wherein the different domain device secret is associated with another domain.

11. An apparatus, comprising:

a processing resource;

memory having instructions executable by the processing resource; and a network attached device communication component coupled to the processing resource, wherein the network attached device communication component is included in a first domain and configured to, in response to being identified by a network management device communication component of a network management device as being part of the first domain:

receive a domain device secret, via short-range communication, from a server communication component, wherein the domain device secret corresponds to the first domain;

perform a number of coupling iterations, wherein each respective one of the number of coupling iterations includes:

generating a network attached device private key and a network attached device public key for each network attached device in the first domain;

providing the network attached device public key and data to the network management device communication component via short-range communication; and receiving a conformation from the network management device communication component, via short-range communication, in response to providing the network attached device public key and data to the network management device communication component, wherein the network attached device communication component is configured to, in response to the apparatus being coupled to the network management device, decrypt the received conformation using the network attached device private key, wherein encrypting and decrypting are performed using a device identification composition engine (DICE)-robust internet of thing (RIOT) protocol.

12. The apparatus of claim 11, wherein the network attached device communication component is configured to, in response to the apparatus being coupled to the network management device:

verify an identity of the network management device communication component; and in response to verifying the identity of the network management device communication component, perform an operation using received data.

13. The apparatus of claim 11, wherein the each respective one of the number of coupling iterations further includes:

receiving a different domain device secret generated by the network management device communication component; and refraining from coupling to the network management device communication component when the different domain device secret is received.

14. The apparatus of claim 11, wherein the first domain corresponds to a first collection of Internet of Things (IoT) devices and a second domain corresponds to a second collection of IoT devices wherein each of the IoT devices in the first domain receives the domain device secret and each of the IoT devices in the second domain receive a different domain device secret.

15. A system, comprising:
a network attached device associated with a first domain within an environment, the network attached device comprising:
a network attached device processing resource; and
a network attached device communication component coupled to the network attached device processing resource configured to generate a network attached device public key and a network attached device private key; and
a network management device associated with the environment, comprising:
a network management device processing resource and memory; and
a network management device communication component coupled to the network management device processing resource and memory, configured to use near field communication (NFC) to perform a coupling iteration, the coupling iteration includes:
monitoring the environment for network attached devices communicatively connected to the network management device;
generating a network management device private key, a network management device public key, and particular domain device secret corresponding to the first domain in the environment, wherein different domain device secrets are generated for multiple domains in the environment and provided to each network attached device within a respective domain of the multiple domains;
transmitting the particular domain device secret and the network management device public key, via NFC to the network attached device within the first domain; and
receiving the network attached device public key corresponding to the network attached device via NFC,
wherein the network management device communication component is configured to:
in response to the network attached device being coupled to the network management device encrypt data from the network management device using the network attached device public key and the particular domain device secret; and
decrypt the data from the network management device using the network attached device private key, wherein encrypting and decrypting are performed using a device identification composition engine (DICE)-robust internet of thing (RIOT) protocol over a wireless LAN network.

16. The system of claim 15, wherein the network management device communication component is configured to, in response to the network attached device being coupled to the network management device:
wherein the data from the network management device indicates an instruction to be provided to the network attached device; and
transmit the encrypted data from the network management device to the network attached device via a Local Area Network (LAN).

17. The system of claim 16, wherein the network attached device communication component is further configured to:
receive the encrypted data from the network management device; and.

18. A method, comprising:
monitoring, by a network management device using near radio-frequency identification (RFID), an environment including a domain a network attached device;
identifying, by the network management device, the network attached device within the environment and assigning the network attached device to a particular domain;
generating, by the network management device, a domain device secret for the particular domain;
generating, by the network management device, a different domain device secret for a second domain, wherein the different domain device secret is provided to each network attached device within the second domain;
coupling the network management device to the network attached device by transmitting, by the network management device via RFID, the domain device secret to the network attached device within the particular domain;
generating a network management device public key and a network management device private key and transmitting via RFID the network management device public key to the network attached device within the particular domain; and
receiving, via RFID, a network attached device public key from the network attached device.

19. The method of claim 18, comprising:
encrypting a message using the network attached device public key and the domain device secret corresponding to the domain including the network attached device; and
transmitting the encrypted message to the network attached device via a wireless network connecting each domain to the to the network management device.

20. The method of claim 19, wherein an instruction is received from an external mobile device prior to encrypting the message using the network attached device public key and the domain device secret corresponding to the domain including the network attached device.

21. An apparatus, comprising:
a processing resource;
memory having instructions executable by the processing resource; and
a network management device communication component coupled to the processing resource, wherein the network management device communication component is configured to, in response to identification of a network attached device within a first domain:
generate a domain device secret corresponding to the first domain, wherein the network attached device within the first domain shares the domain device secret with another network attached devices included in the first domain;
determine the domain device secret associated with the first domain;
refrain from encrypting messages for the network attached device using a different domain device secret;
perform a number of coupling iterations for each network attached device within the first domain, wherein each respective one of the number of coupling iterations includes:
generating a network management device private key and a network management device public key;
providing, via short-range communication, the network management device public key and the domain device secret corresponding to the first domain to a network attached device communication component included in each network attached device of the first domain; and receiving, via short-range communication, a network attached device public key from each network attached device within the first domain and data from the network attached device communication component in response to providing the network management device public key to the network attached device communication component.

22. An apparatus, comprising:

a processing resource;

memory having instructions executable by the processing resource; and a network attached device communication component coupled to the processing resource, wherein the network attached device communication component is included in a first domain and configured to, in response to being identified by a network management device communication component of a network management device as being part of the first domain:

receive a domain device secret, via short-range communication, from a server communication component, wherein the domain device secret corresponds to the first domain;

perform a number of coupling iterations, wherein each respective one of the number of coupling iterations includes:

generating a network attached device private key and a network attached device public key for each network attached device in the first domain;

providing the network attached device public key and data to the network management device communication component via short-range communication;

receiving a conformation from the network management device communication component, via short-range communication, in response to providing the network attached device public key and data to the network management device communication component; and receiving a different domain device secret generated by the network management device communication component; and refraining from coupling to the network management device communication component when the different domain device secret is received.

* * * * *